(12) United States Patent
Kose et al.

(10) Patent No.: US 7,639,449 B1
(45) Date of Patent: Dec. 29, 2009

(54) PASSIVE FLY HEIGHT ADJUSTMENT TO COMPENSATE FOR AMBIENT PRESSURE CHANGES IN A DISK DRIVE

(75) Inventors: Rickmer Kose, San Francisco, CA (US); Brian D. Strom, Cupertino, CA (US)

(73) Assignee: Maxtor Corporation, Scotts Valley, CA (US)

( * ) Notice: Subject to any disclaimer, the term of this patent is extended or adjusted under 35 U.S.C. 154(b) by 479 days.

(21) Appl. No.: 11/059,032

(22) Filed: Feb. 15, 2005

Related U.S. Application Data

(60) Provisional application No. 60/587,395, filed on Jul. 13, 2004.

(51) Int. Cl.
G11B 33/14 (2006.01)
G11B 21/10 (2006.01)
G11B 21/21 (2006.01)

(52) U.S. Cl. ............... 360/97.02; 360/234.6; 360/294.7
(58) Field of Classification Search ............... 360/97.01, 360/97.02, 97.03, 98.01, 234.6, 254, 294.7
See application file for complete search history.

(56) References Cited

U.S. PATENT DOCUMENTS

| | | | | |
|---|---|---|---|---|
| 2,937,240 A | * | 5/1960 | Harker | .................... 360/234.6 |
| 3,488,648 A | * | 1/1970 | Church | .................... 360/234.6 |
| 5,454,157 A | | 10/1995 | Ananth et al. | |
| 6,317,286 B1 | * | 11/2001 | Murphy et al. | ........... 360/97.02 |
| 6,567,235 B2 | | 5/2003 | Kasetty et al. | |

* cited by examiner

*Primary Examiner*—Craig A. Renner
(74) *Attorney, Agent, or Firm*—Fellers, Snider, et al.

(57) ABSTRACT

A disk drive includes a drive circuitry, a suspension, a slider assembly that includes a read/write head, and a pressure compensator. The pressure compensator is electrically decoupled from the drive circuitry. A portion of the pressure compensator has a volume that passively changes when an ambient pressure near the pressure compensator changes. The pressure compensator at least partially offsets a change in a head-to-disk spacing that occurs when an ambient pressure near the pressure compensator changes. The pressure compensator can exert a force on the slider assembly to change a pivot angle between the suspension and the slider assembly, and/or to change a pitch angle between the slider assembly and the storage disk. In alternate embodiments, the pressure compensator can include a piston that moves or a resilient membranous material that changes shape based on changes in ambient pressure.

57 Claims, 6 Drawing Sheets

PASSIVE FLY HEIGHT ADJUSTMENT TO COMPENSATE FOR AMBIENT PRESSURE CHANGES IN A DISK DRIVE

RELATED APPLICATION

This Application claims the benefit on U.S. Provisional Application Ser. No. 60/587,395 filed on Jul. 13, 2004. The contents of U.S. Provisional Application Ser. No. 60/587,395 are incorporated herein by reference.

BACKGROUND

Disk drives are widely used in computers, consumer electronics and data processing systems for storing information in digital form. The disk drive typically includes one or more storage disks and one or more head suspension assemblies. Each head suspension assembly includes a slider assembly which has an air bearing surface, a leading edge, a trailing edge and a read/write head positioned near the trailing edge. The read/write head transfers information to and from the storage disk. Rotation of the storage disk causes the slider assembly to ride on an air-supported journal bearing (also referred to as an "air bearing") so that the read/write head is at a distance from the storage disk that is commonly referred to as a "head-to-disk spacing".

Because today's disk drives utilize storage disks having increasingly high densities of data tracks, decreasing the head-to-disk spacing has become of great importance. However, this desire for a very small head-to-disk spacing must be balanced with tribological concerns in order to avoid damage to the read/write head and/or the storage disk, as well as loss of data.

Maintaining a relatively small and consistent head-to-disk spacing is further complicated by other factors. In particular, ambient pressure increases or decreases due to changes in altitude, for example, can cause the air bearing to ride at a higher or lower level relative to the storage disk, likewise causing a change in the head-to-disk spacing during various operations of the disk drive. More specifically, it is well known that with conventional disk drives, the head-to-disk spacing tends to decrease at higher altitudes. In fact, the head-to-disk spacing can decrease by approximately 10-30 percent, or roughly 1.5 nanometers at 10,000 feet above sea level. As a consequence, these changes in head-to-disk spacing can result in head-to-disk contact at relatively high altitudes, or an excessive head-to-disk spacing at relatively low altitudes. Either of these conditions can potentially cause one or more of the following adverse effects: off-track writing, degraded data transfer rates, damage to the slider assembly, damage to the storage disk, permanent data loss and/or other related problems.

SUMMARY

The present invention is directed to a disk drive that includes a head suspension assembly having a suspension and a slider assembly that includes a read/write head. The disk drive also includes a pressure compensator that is coupled to one of the storage disk and the head suspension assembly. In one embodiment, a portion of the pressure compensator has a sealed fluid container having a volume that passively changes when the ambient pressure near the pressure compensator changes. With this design, the pressure compensator can at least partially offset a change in a head-to-disk spacing that occurs when an ambient pressure near the pressure compensator changes during a change in altitude, for instance.

The disk drive also includes a drive circuitry. In one embodiment, the pressure compensator is electrically decoupled from the drive circuitry. In one embodiment, the pressure compensator exerts a force on the slider assembly that changes when the ambient pressure near the pressure compensator changes. For example, the force exerted by the pressure compensator can change a pivot angle between the suspension and the slider assembly, and/or can change a pitch angle between the slider assembly and the storage disk.

In one embodiment, the pressure compensator has a shape that changes when the ambient pressure near the pressure compensator changes. The pressure compensator can include a fluid container and a gas within the container. In this embodiment, the fluid container allows for volume changes of the gas so that the volume of the gas is approximately inversely proportional to the pressure of the gas. In other words, the fluid container can conform to the volume change of the gas when the pressure inside the container changes. The fluid container can be at least partially formed from a bimetallic material so that the container expands in a first direction when a decrease in ambient pressure occurs, and in a second direction that is different than the first direction when an increase in temperature near the pressure compensator occurs. In one embodiment, the pressure compensator includes a piston that moves based on changes in ambient pressure. Alternatively, the pressure compensator can include a resilient membranous material that changes shape based on changes in ambient pressure.

The present invention also includes a method of adjusting the head-to-disk spacing in a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
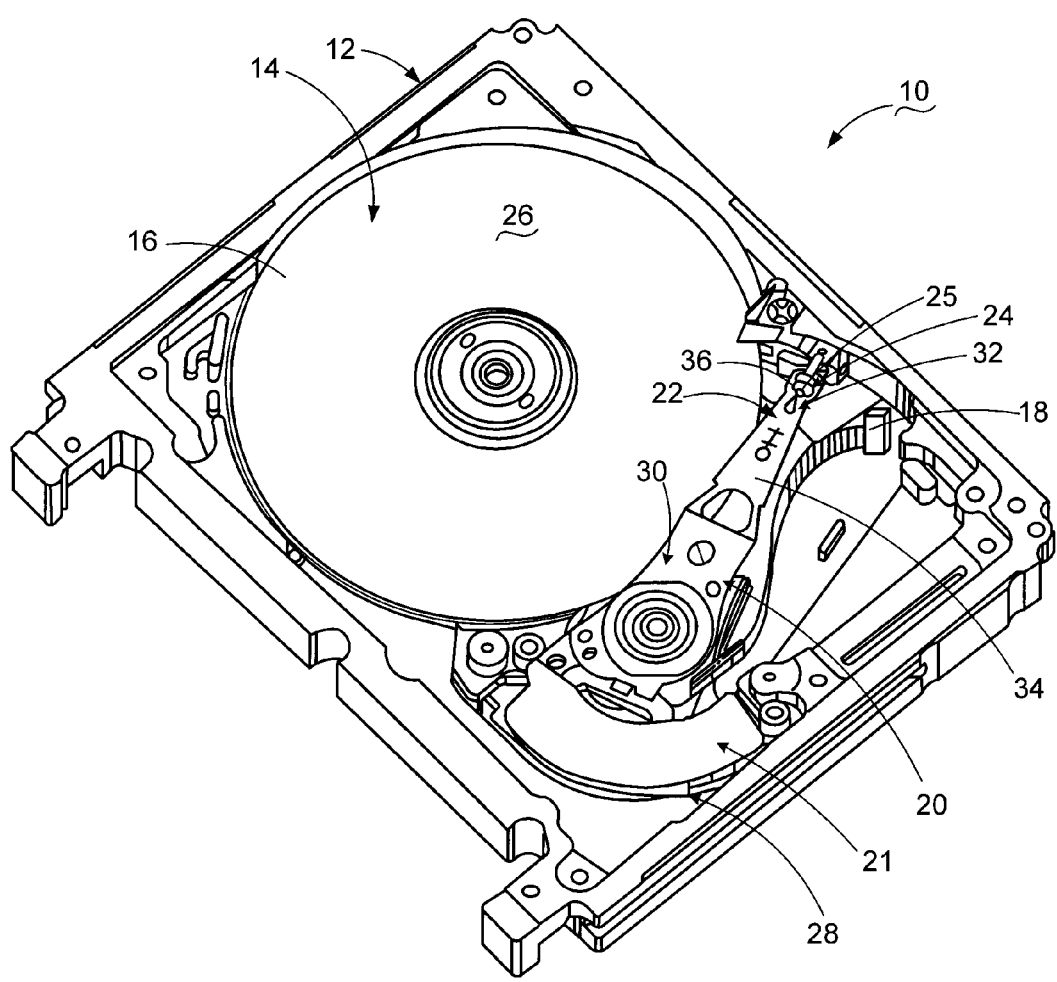
FIG. 1 is a perspective view of a disk drive having features of the present invention.

FIG. 1 illustrates a perspective view of a disk drive 10 that includes (i) a drive housing 12, (ii) a disk assembly 14 having one or more storage disks 16, (iii) a drive circuitry 18, (iv) a head stack assembly 20 including an actuator assembly 21, and one or more head suspension assemblies 22 that each includes a slider assembly 24, and (v) a pressure compensator 25.

Each storage disk 16 includes one or more disk surfaces 26 that each has a plurality of concentric data tracks (not shown) that store data, including a target track. Further, the storage disk 16 can also include non-data tracks, such as servo tracks. Once the slider assembly 24 stabilizes over the target track, data is read from the storage disk 16 during a read operation and is transferred to the storage disk 16 during a write operation. The drive circuitry 18 sends electrical current to and/or receives electrical signals from the slider assembly 24 during read and/or write operations.

The head stack assembly 20 illustrated in FIG. 1 includes an actuator motor 28, one head suspension assembly 22, and one actuator arm 30. The head suspension assembly 22 is secured to the actuator arm 30, and supports the slider assembly 24 near one of the disk surfaces 26 of the storage disk 16 during operation of the disk drive 10. The actuator motor 28 moves the actuator arm 30 and the head suspension assembly 22 relative to the storage disk 16. The head stack assembly 20 can alternatively include a plurality of actuator arms 30 that each supports up to two head suspension assemblies 22.

Each head suspension assembly 22 includes a slider assembly 24 and a suspension 32 that supports the slider assembly 24. The suspension 32 includes a load beam 34 and a flexure 36. The load beam 34 attaches the flexure 36 and the slider assembly 24 to the actuator arm 30. Each load beam 34 can be flexible in a direction perpendicular to the storage disk 16 and can act as a spring for supporting the slider assembly 24. Typically, the load beam 34 is formed from a metallic material such as stainless steel or other suitable materials. In an alternative embodiment, the load beam 34 and the flexure 36 can be formed as an integral, unitary structure that can utilize homogeneous or non-homogeneous materials.

Each flexure 36 couples the slider assembly 24 to the load beam 34. The flexure 36 is formed from a metallic material such as stainless steel or other suitable materials.

The slider assembly 24 transfers information between the drive circuitry 18 and the storage disk 16. The design of the slider assembly 24 can vary depending upon the requirements of the suspension assembly 22 and/or the disk drive 10. The composition of the slider assembly can vary. In one embodiment, portions of the slider assembly 24 can be formed from materials such as alumina titanium carbide ceramic, for example.

The pressure compensator 25 passively compensates for changes in ambient pressure by changing the positioning of the slider assembly 24 relative to the storage disk 16 and/or the distance between a portion of the slider assembly 24 and the storage disk 16, as provided herein. In one embodiment, the pressure compensator 25 is electrically decoupled from the drive circuitry 18, e.g., the pressure compensator 25 does not receive electrical current or other signals from the drive circuitry 18 or any other source.

Figure 2A:
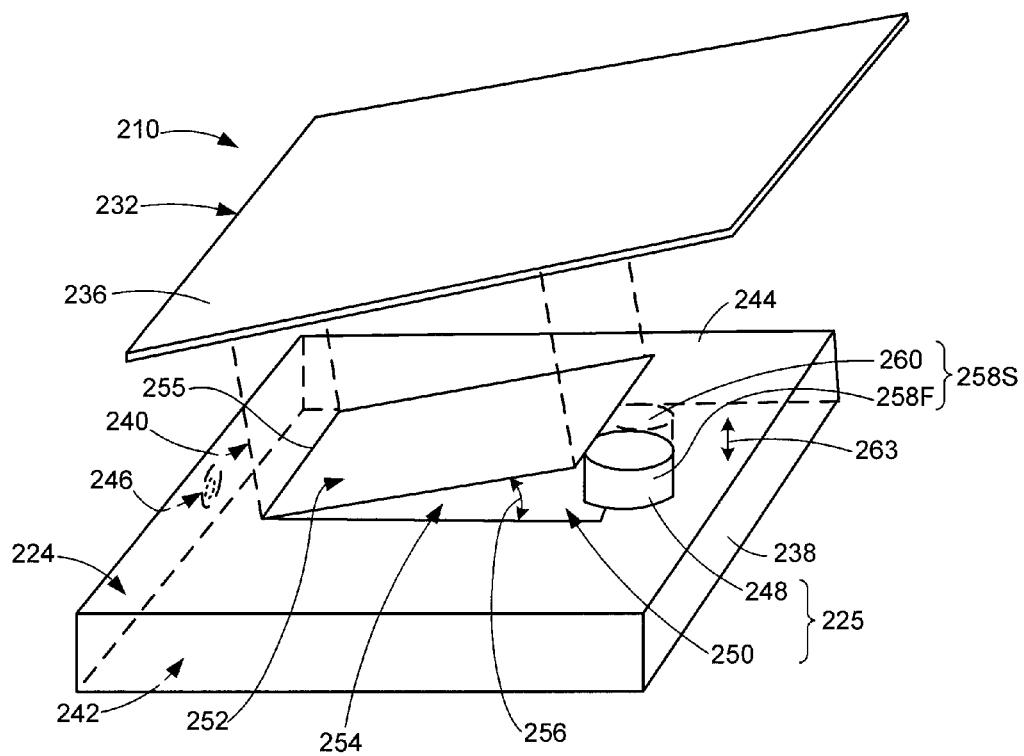
FIG. 2A is a partially exploded, perspective view of a portion of a suspension, a slider assembly and one embodiment of a pressure compensator having features of the present invention.

FIG. 2A is a partially exploded, simplified top perspective view of a portion of one embodiment of the disk drive 210, including a portion of a suspension 232, a slider assembly 224 and a pressure compensator 225. As provided herein, at least a portion of the pressure compensator 225 changes its orientation, positioning, shape and/or volume as ambient pressure changes occur due to changes in altitude, climate, etc. As described in greater detail below, these changes to the pressure compensator 225 cause a corresponding relative movement between the slider assembly 224 and the suspension 232 and/or between the slider assembly 224 and the storage disk 16 (illustrated in FIG. 1). This relative movement results in an adjustment to the spacing between a portion of the slider assembly 224 and the storage disk 16.

The slider assembly 224 includes a leading edge 238, a trailing edge 240 opposite the leading edge 238, a flying side 242 (also sometimes referred to as an air bearing surface or "ABS"), a back side 244 opposite the flying side, and a read/write head 246 (shown in phantom in FIG. 2A) positioned near the trailing edge 240 and the flying side 242. The general direction of travel of the storage disk 16 relative to the slider assembly 224 is that a point on the storage disk 16 passes along the flying side 242 first near the leading edge 238, then toward and past the trailing edge 240.

Figures 3A, 3B:
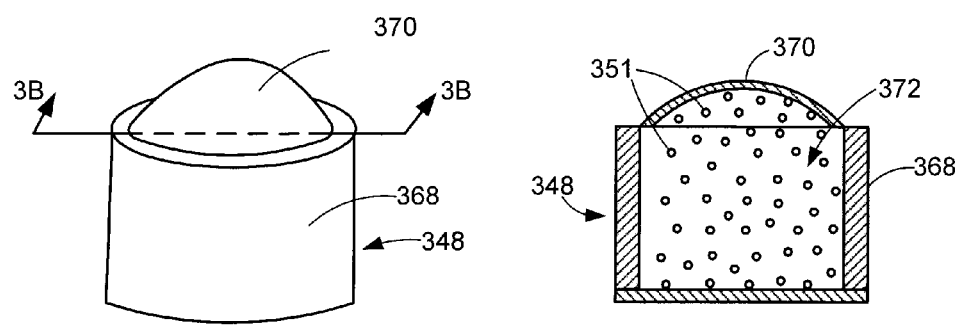
FIG. 3A is a perspective view of another embodiment of the pressure compensator.
FIG. 3B is a cross-sectional view of the pressure compensator taken on line 3B-3B in FIG. 3A.

In this embodiment, the pressure compensator 225 includes a sealed fluid container 248, a slider pivot 250 and a fluid 351 (illustrated in FIG. 3B as small circles). The fluid container 248 contains the fluid 351. However, in this embodiment, the fluid is subject to expansion and contraction based on pressure changes external to the fluid container 248, as explained herein. The configuration of the fluid container 248 can vary depending upon the design requirements of the disk drive 210. For example, in the embodiment illustrated in FIG. 2A, the fluid container 248 is somewhat cylindrical. In non-exclusive alternative embodiments, the fluid container 248 can be conical, frusto-conical, spherical, cube-shaped, or can have any other suitable geometry.

Additionally, the volume of the fluid container 248 can vary, and is substantially dictated by the volume of the fluid 351 within the fluid container 248. In one embodiment, the fluid container 248 can have a volume of at least approximately $10^{-4}$ mL$^3$. In alternative non-exclusive embodiments, depending upon the particular function of the pressure compensator 225, the fluid container 248 can have a volume of at least approximately $10^{-7}$ mL$^3$, $10^{-6}$ mL$^3$, $10^{-5}$ mL$^3$, $10^{-3}$ mL$^3$, $10^{-2}$ mL$^3$, $10^{-1}$ mL$^3$, or 1 mL$^3$. Moreover, it is recognized that the volume of the fluid container 248 changes, as provided herein.

Further, the type of fluid 351 that can be used within the fluid container 248 can be varied. Non-exclusive examples of fluid 351 that can be used in the fluid container 248 include any suitable gas, such as air, oxygen, hydrogen, nitrogen or helium. Any other fluid 351 can be used provided such fluid 351 can expand and/or contract as a function of the atmospheric pressure external to the fluid container 248.

As explained in greater detail below, the materials used to form the fluid container 248 can vary, provided that fluid 351 within the fluid container 248 is permitted to expand and/or contract due to ambient changes in pressure outside the fluid container 248.

In this embodiment, the slider pivot 250 couples the suspension 232 to the slider assembly 224. In the embodiment illustrated in FIG. 2A, the slider pivot 250 acts as a hinge between the suspension 232 and the slider assembly 224.

More specifically, in this embodiment, the slider pivot 250 can have a first pivot region 252 and a second pivot region 254 that intersect at a pivot area 255. The first pivot region 252 is secured to the suspension 232 and the second pivot region 254 is secured to the back side 244 of the slider assembly 224. Alternatively, the second pivot region 254 can be secured to other portions of the slider assembly 224. It is recognized that either pivot region 252, 254 can be the first pivot region 252 or the second pivot region 254.

The materials used for the slider pivot 250 are compliant to movement at the pivot area 255, e.g., relative movement between the first pivot region 252 and the second pivot region 254. However, the slider pivot 250 should be relatively stiff in a torsional direction. For example, the slider pivot 250 can be formed from relatively rigid materials such as a folded stainless steel sheet, other metals or similar suitably rigid materials having the desired properties and effect.

In this embodiment, the first pivot region 252 is secured to a flexure 236 of the suspension 232. The first pivot region 252 and the second pivot region 254 together form a pivot angle 256. As an overview, when the ambient pressure outside of the fluid container 248 changes, the fluid 351 within the fluid container 248 expands or contracts causing a volumetric change of the fluid container 248. More specifically, as the ambient pressure decreases outside the fluid container 248, such as at higher altitudes, the volume of the fluid 351 in the interior of the fluid container 248 correspondingly increases. The positioning of the fluid container 248 relative to the slider pivot 250 causes relative movement between the first pivot region 252 and the second pivot region 254, which in turn changes the pivot angle 256. Further, because the first pivot region 252 is secured to the suspension 232 and the second pivot region 254 is secured to the slider assembly 224, a change in the pivot angle 256 results in relative movement between the suspension 232 and the slider assembly 224.

In the embodiment illustrated in FIG. 2A, the pressure compensator 225 moves between a first position and a second position (illustrated by arrow 263). In the first position, the fluid 351 within the fluid container 248, and thus, the fluid container 248 itself, has a first volume 258F, which occurs during a relatively high ambient pressure. In the second position, the fluid 351, and thus, the fluid container 248, have a second volume 258S equal to the first volume 258F plus a change in volume 260 (illustrated in phantom) that occurs during a relatively low ambient pressure. Generally, as the ambient pressure increases, the volume of the fluid 351 within the fluid container 248 decreases. Thus, the volume of the fluid container 248 likewise decreases. Conversely, as the ambient pressure decreases, the volume of the fluid 351 within the fluid container 248, and thus, the volume of the fluid container 248, increases.

Figure 2B:
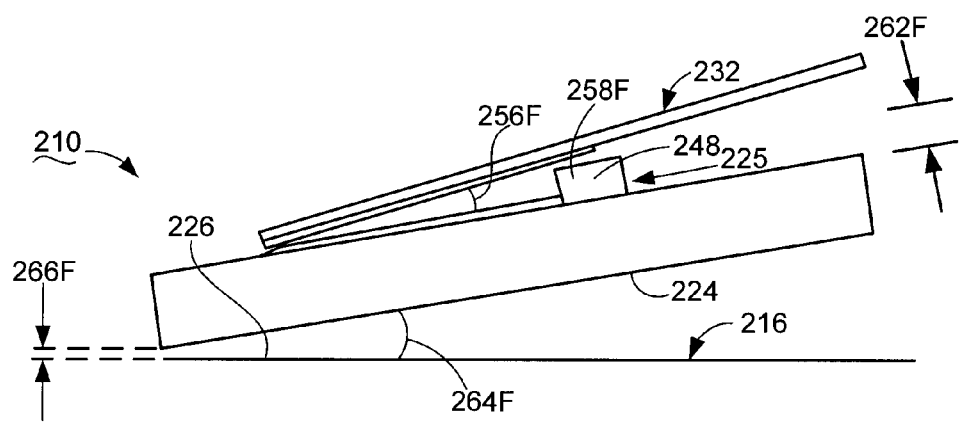
FIG. 2B is a simplified side view of the portion of the suspension, a storage disk, the slider assembly and one embodiment of the pressure compensator shown in a first position.
Figure 2C:
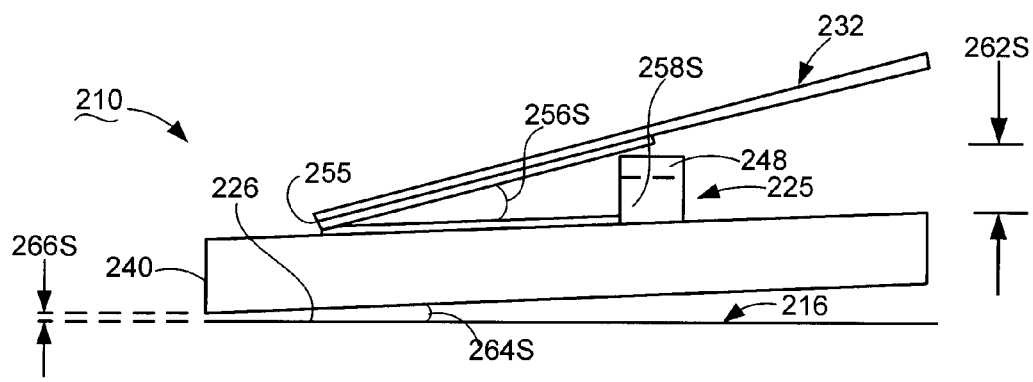
FIG. 2C is a simplified side view of the portion of the suspension, a storage disk, the slider assembly and one embodiment of the pressure compensator shown in a second position.

FIGS. 2B and 2C are simplified side views of the portion of the disk drive 210 illustrated in FIG. 2A, including a portion of the suspension 232, the slider assembly 224 and the pressure compensator 225, and further including a portion of a disk surface 226 of an adjacent storage disk 216. It is recognized that the positioning, including various angles of the structures, illustrated in FIGS. 2B and 2C are greatly exaggerated for clarity.

In FIG. 2B, the pressure compensator 225 in the first position so that slider assembly 224 is positioned at a first pivot angle 256F relative to the suspension 232. In the first position, the fluid container 248 has a relatively low first height 262F that generates the first pivot angle 256F. In this example, the first position occurs when the pressure compensator 225 is in a substantially non-expanded or a retracted position. For example, the first position can occur when the disk drive 210 is at sea level, or at approximately 1 atmosphere (atm). Alternatively, the first position can be at some other barometric pressure, such as the ambient pressure of the location where the disk drive 210 was manufactured, as an example.

In accordance with one embodiment of the present invention, in the first position, the pressure of the fluid 351 (illustrated in FIG. 3B) within the fluid container 248 can be substantially similar to the ambient pressure immediately surrounding the exterior of the fluid container 248 and/or the disk drive 210. In the first position, the first pivot angle 256F is substantially determined by the materials and the structure of the suspension 232, the slider assembly 224, as well as the materials and structure of the non-expanded fluid container 248 and the slider pivot 250. Stated another way, the volume of the fluid 351 has not yet increased and therefore the pressure compensator 225 has not caused any change in the first pivot angle 256F greater than a predetermined initial pivot angle that depends upon the design requirements of the disk drive 210.

In the embodiments provided herein, the positioning of the suspension 232 remains substantially unchanged relative to the disk surface 226 regardless of the pivot angle 256. Instead, the positioning of the slider assembly 224 changes relative to the suspension 232 and the disk surface 226. For example, in the first position, the slider assembly 224 forms a first pitch angle 264F (also sometimes referred to as a "pitch static attitude") with the disk surface 226. Further, in the first position, the pressure compensator 225 causes a first head-to-disk spacing 266F with the disk surface 226.

FIG. 2C is a simplified side view of the portion of the disk drive 210 illustrated in FIG. 2A, showing the pressure compensator 225 in the second position so that slider assembly 224 is positioned at a second pivot angle 256S relative to the suspension 232. Boyle's law provides that at a given temperature, the pressure of a gas is inversely proportional to the volume of the gas. Stated as an equation, Boyle's law can be expressed as follows:

$$p_1/p_2 = V_2/V_1$$

Thus, if the pressure outside the fluid container 248 has decreased, the fluid 351 within the fluid container 248 would likewise want to equilibrate with the decreased external pressure. Because the fluid container 248 provided herein is expandable as provided in greater detail below, in accordance with Boyle's law, the volume of the fluid 351 would increase to the second volume 258S in order to approach and/or achieve equilibrium with the pressure external to the fluid container 248. As a result of the increase in volume of the fluid 351 and the structure of the fluid container 248, in the second position, the fluid container 248 has a relatively high second height 262S in comparison to the first height 262F.

Because the suspension 232 and the storage disk 216 remain at a substantially constant angle relative to each other, the angle of the slider assembly relative to both the suspension 232 and the disk surface 226 changes. Thus, the second height 262S results in a second pivot angle 256S that is greater than the first pivot angle 256F. In non-exclusive alternative embodiments, the second pivot angle 256S can be greater than the first pivot angle 256F by at least approximately 0.1%, 0.25%, 0.5%, 0.75%, 1.0%, 1.5%, 2.0%, or any other suitable percentage in order to achieve the desired effect depending upon the intended use of the disk drive 210.

Moreover, the second height 262S results in a second pitch angle 264S that is less than the first pitch angle 264F. In non-exclusive alternative embodiments, the second pitch angle 264S can be less than the first pitch angle 264F by at least approximately 0.1%, 0.25%, 0.5%, 0.75%, 1.0%, 1.5% or 2.0%. As a result of the decreased second pitch angle 264S in the second position, as well as the location of the pivot area 255, the read/write head 246 (illustrated in FIG. 2A) which is positioned near the trailing edge 240 of the slider assembly 224 is effectively raised away from the disk surface 226. With this design, because higher altitudes generally cause a decrease in head-to-disk spacing, the pressure compensator 225 effectively compensates for this lower head-to-disk spacing. Stated another way, despite the disparity in ambient pressure as depicted in FIGS. 2B and 2C, the head-to-disk spacings 266F, 266S remain substantially constant, allowing for greater reliability of the disk drive 210.

In this example, the second position occurs when the pressure compensator 225 is in a substantially expanded position. In one embodiment, the second position can occur when the disk drive 210 is at a relatively high altitude, or at a pressure that is less than approximately 1 atmosphere (atm) or is otherwise less than the barometric pressure where the disk drive was manufactured. For example, the pressure ratio for an altitude change between sea level and 10,000 feet above sea level is approximately 760/520 torr, or approximately 1.46. This ratio translates to a potential volume increase of the fluid container of roughly 46% between sea level and 10,000 feet. Depending upon the tuning of the geometric design of the fluid container 248, the second height 262S can be greater than, equal to, or less than this percentage, resulting in the desired second pitch angle 264S to achieve the required second head-to-disk spacing 266S.

FIG. 3A is a perspective view of one embodiment of the fluid container 348. In this embodiment, the fluid container 348 includes a container body 368 and a resilient expander 370. In one embodiment, the container body 368 is formed from materials that have a relatively high temperature expansion coefficient. This relatively high temperature expansion coefficient allows expansion in a lateral direction (also sometimes referred to herein as a "first direction") with an increase in temperature. This lateral expansion inhibits an increase in pressure caused by thermal expansion of the fluid 351 (illustrated in FIG. 3B) within the fluid container 348, as explained in greater detail below. The materials used to form the container body 368 can vary depending upon the type of fluid 351 used within the fluid container 348. In one embodiment, the rate of expansion of the materials used to form the container body 368 should be similar to the rate of expansion of the fluid 351 within the fluid container 348 caused by changes in temperature.

In one embodiment, the expander 370 can be formed from a flexible and/or resilient membranous material that is expandable with changes in volume within the fluid container 348 that are induced by changes in ambient pressure outside the fluid container 348. For example, the expander 370 can be formed from a polymer epoxy material, plastic or any other suitable material. In an expanded condition such as that illustrated in FIG. 3A, the expander 370 can be substantially dome-shaped, cylindrical or can have any other suitable geometry to effectuate a change in the pivot angle 256 (illustrated in FIG. 2A). In this embodiment, the expansion of the expander 370 occurs substantially in a second direction that is orthogonal to the first direction, as explained in greater detail below. As used herein, the first direction and the second direction are representative of any two different directions.

FIG. 3B is a cross-sectional view of the fluid container 348 illustrated in FIG. 3A, including the fluid 351 that fills a container interior 372 of the fluid container 348. In this embodiment, the fluid 351 has expanded due to a decrease in ambient pressure outside of the fluid container 348, causing the expander 370 to become somewhat dome-shaped.

Figure 3C:
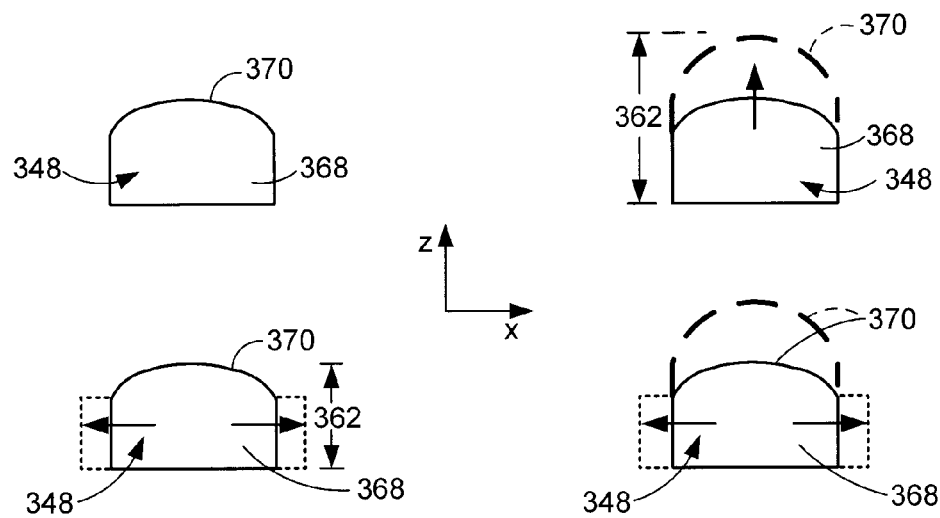
FIG. 3C shows four simplified side view illustrations of a fluid container under different temperature and pressure conditions.

FIG. 3C is a simplified representation of how four different external temperature and pressure conditions affect the the fluid container 348 provided herein. In the upper left illustration, the fluid container 348 is illustrated at a relatively low temperature and a relatively high ambient pressure, such as approximately 1 atm. The paragraph beginning on page line 18 has been amended as follows:

In the upper right illustration, the fluid container 348 is shown at a relatively low temperature and a relatively low ambient pressure, thereby causing an increase in a height 362 of the fluid container in a Z direction (increased height illustrated in phantom with dashed line). In this embodiment, the container body 368 is formed from materials that are resistant to expansion in an X direction caused by pressure changes.

In the lower left illustration, the fluid container 348 is shown at a relatively high temperature and a relatively high ambient pressure. In one embodiment, because the container body 368 is formed from materials that have a relatively high temperature expansion coefficient, the container body 368 can expand in the X direction (expansion illustrated in phantom with dotted line) with the increased temperature, while inhibiting expansion of the expander 370 in the Z direction. With this design, an increase (or decrease) in temperature will have a reduced impact on the height 362 of the container body 348, and thus, the change in head-to-disk spacing.

In the lower right illustration, the fluid container 348 is shown at a relatively high temperature and a relatively low ambient pressure. In this illustration, the temperature has an effect on expansion of the container body in the X direction (expansion illustrated in phantom with dotted line), and the low pressure causes expansion of the expander 370 in the Z direction (expansion illustrated in phantom with dashed line).

Figure 4:
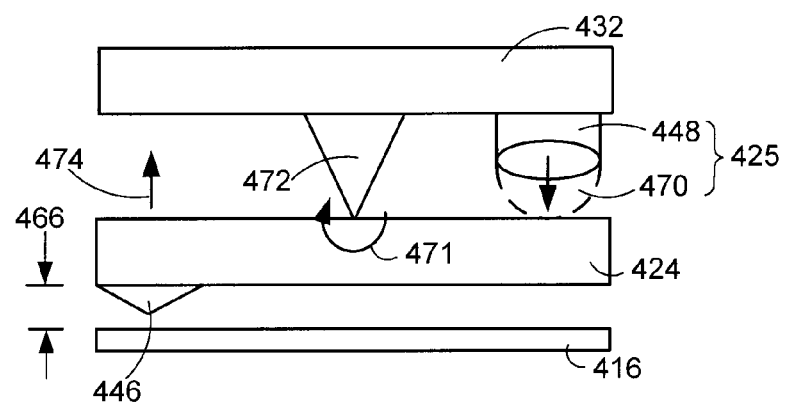
FIG. 4 is a side view of a portion of the disk drive including yet another embodiment of the pressure compensator.

FIG. 4 is a simplified representation of a suspension 432 supporting a slider assembly 424, a storage disk 416, and another embodiment of a pressure compensator 425. The suspension 432 urges the slider assembly 424 against a pivot 472, such as a gimble. In this embodiment, the expander 470 of the fluid container 448 directly exerts a force on the slider assembly 424 when the ambient pressure decreases. This illustration shows this force that is exerted on the slider assembly 424 directly translates into a pivoting or rotation 471 of the slider assembly 424 about a pivot 472, thereby causing an increase in the head-to-disk spacing 466, e.g., movement of the read/write head 446 in a direction 474 away from the storage disk 416.

Figure 5:
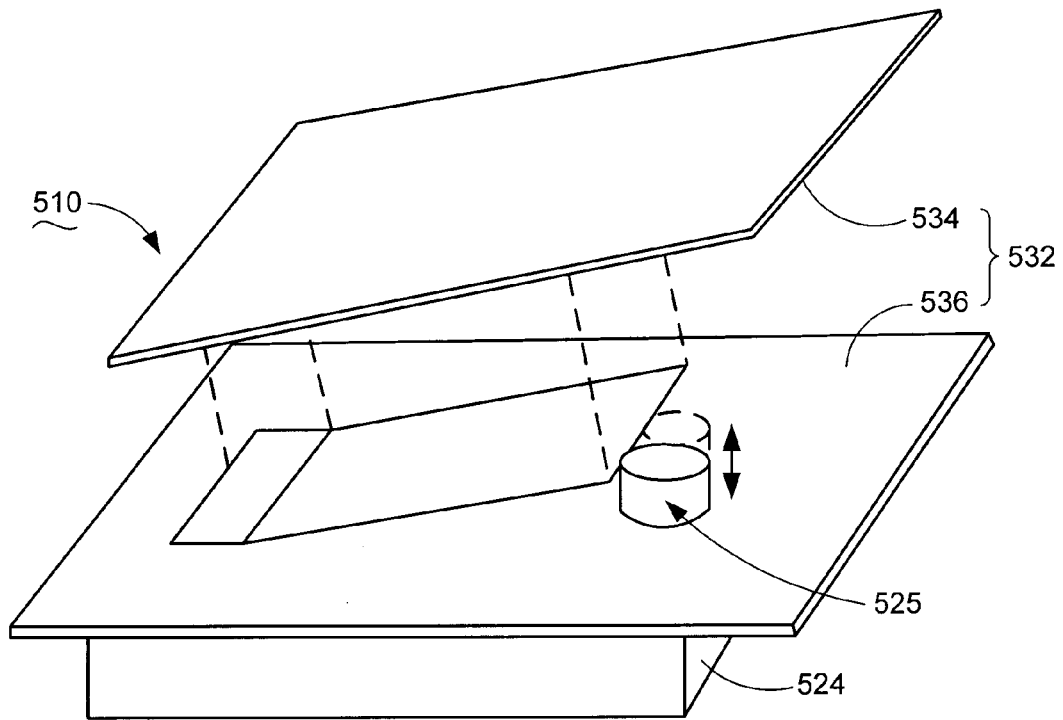
FIG. 5 is a partially exploded, perspective view of another embodiment of a portion of a suspension assembly, a slider assembly and the pressure compensator.

FIG. 5 is a partially exploded, simplified top perspective view of a portion of another embodiment of the disk drive 510, including a portion of a suspension 532, a slider assembly 524 and a pressure compensator 525. In this embodiment, the pressure compensator 525 is not secured directly to the slider assembly 524, but is positioned between the load beam 534 and the flexure 536. Thus, in the embodiment illustrated in FIG. 5, the flexure 536 and the slider assembly 524 move together relative to the load beam 534 following a decrease in ambient pressure.

Figure 6:
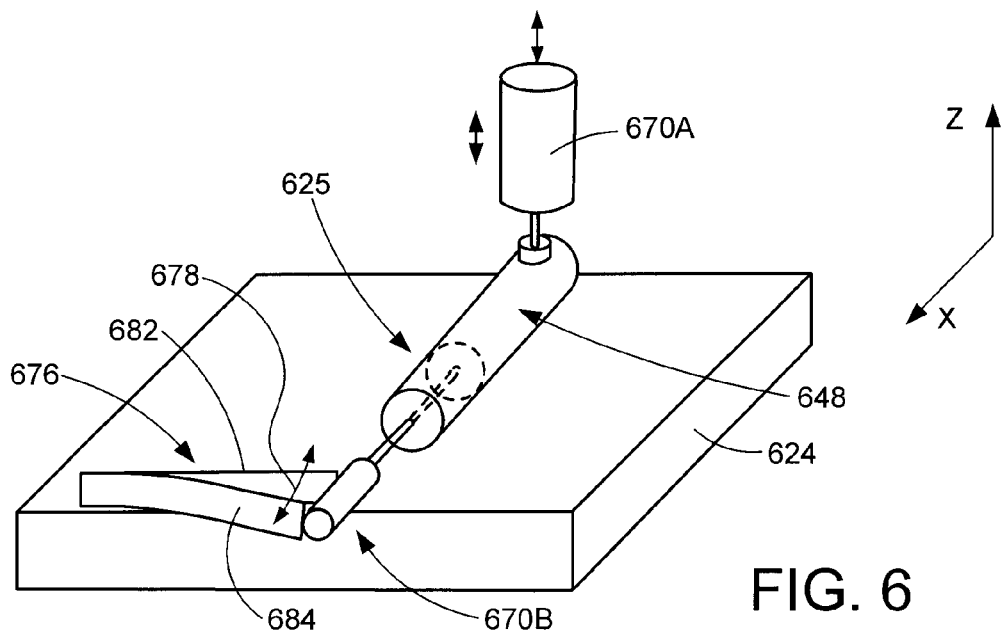
FIG. 6 is a perspective view of another embodiment of the pressure compensator and a slider assembly.

FIG. 6 is a simplified perspective view of a slider assembly 624 and yet another embodiment of the pressure compensator 625. In this embodiment, the suspension has been omitted for clarity. Further, in the embodiment illustrated in FIG. 6, the pressure compensator 625 includes a fluid container 648, one or more expanders and a temperature expansion controller 676. In this embodiment, the pressure compensator 625 includes a first expander 670A and a second expander 670B. The first expander 670A is coupled to the suspension.

The fluid container 648 and the first expander 670A can function substantially as previously described, although the configuration and/or materials can be varied from those previously provided herein. For example, the orientation of the fluid container 648 and the first expander 670A can be altered as shown in FIG. 6. Further, one or more of the expanders 670A, 670B can include a piston or another mechanical structure that moves based on changes in pressure. It is recognized that any suitable mechanical structures known to those skilled in the art can be used for the expanders 670A, 670B.

In this embodiment, the temperature expansion controller 676 is secured to the slider assembly 624. Alternatively, the temperature expansion controller 676 can be secured to another part of the disk drive, such as a portion of the suspension, for example. In FIG. 6, the temperature expansion controller 676 is illustrated in two alternate positions between which the temperature expansion controller 676 moves depending on the temperature. In a first position 682, the temperature expansion controller 676 exerts a force on the second expander 670B upon a decrease in ambient pressure to inhibit the second expander 670B from extending in a direction along an X axis. With this design, upon a decrease in ambient pressure, the volumetric increase within the fluid container 648 will principally translate to moving the first expander 670A along the Z axis, which is coupled to the suspension.

In the second position 684, the temperature expansion controller 676 has a decreased force against the second expander 670B upon an increase in temperature. It is recognized that the temperature expansion controller 676 can be in any position along a continuum of movement (illustrated by arrow 678) between and including the first position 682 and the second position 684. In one embodiment, the temperature expansion controller 676 can be a bimetallic structure that is substantially unaffected by changes in atmospheric pressure, but which bends or moves in a direction away from the second expander 670B upon an increase in temperature. As a result, movement of the first expander 670A along a Z axis caused by an increase in temperature resulting in a volumetric expansion of the fluid within the fluid container 648 will be inhibited because the increase in volume will be at least partially or completely accommodated by movement of the second expander 670B.

Figure 7A:
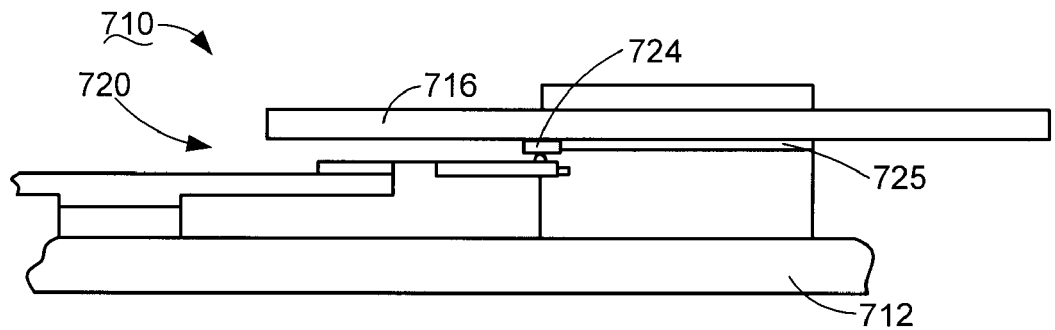
FIG. 7A is a simplified side view of another embodiment of a portion of the disk drive having features of the present invention, including a pressure compensator.

FIG. 7A is a side view of still another embodiment of a portion of a disk drive 710. In this embodiment, the disk drive 710 includes a drive housing 712, a storage disk 716, a head stack assembly 720, and a pressure compensator 725. The disk drive 710 also includes a disk mount (not shown) to which the storage disk 716 is secured. In this embodiment, the pressure compensator 725 operates similarly to those previously described herein with changes in ambient pressure. However, in the embodiment illustrated in FIG. 7A, the pressure compensator 725 is coupled to or directly secured to the disk mount.

The pressure compensator 725 can be substantially annular in shape, or can have another suitable configuration. In this embodiment, the pressure compensator 725 acts as a spacer that can expand and/or contract to exert a force on the disk mount to raise or lower the disk mount, and thus, the storage disk 716, relative to the head stack assembly 720. With this design, the spacing between a portion of the slider assembly 724 and the storage disk 716 can be controlled with changes in the ambient pressure, without adding any structures to the head stack assembly 720.

Figure 7B:
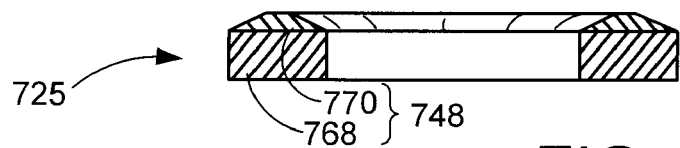
FIG. 7B is an enlarged cross-sectional view of the pressure compensator illustrated in FIG. 7A.

FIG. 7B is a cross-sectional view of one embodiment of the pressure compensator 725 that can be used in this application. In this embodiment, the pressure compensator 725 is somewhat doughnut shaped, and includes a fluid container 748 having a container body 768 and an expander 770. In the embodiment illustrated in FIG. 7B, the pressure compensator 725 is shown in somewhat of an expanded position, e.g., due to relatively low ambient pressure external to the pressure compensator 725.

Figure 8:
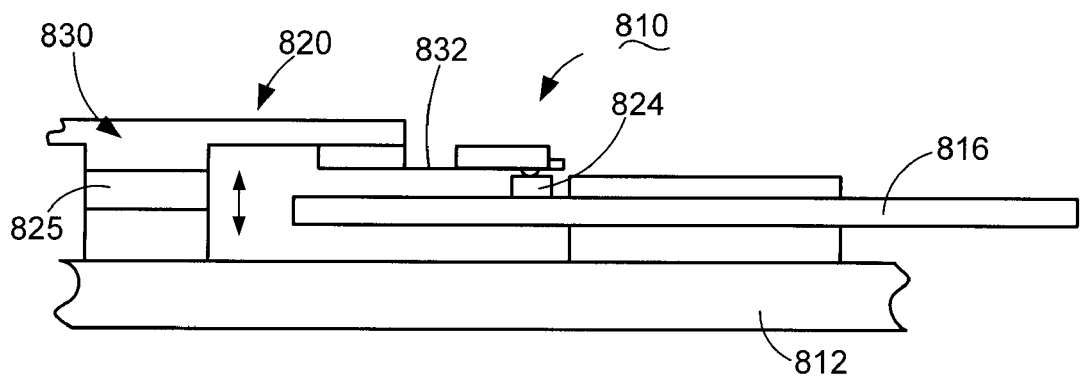
FIG. 8 is a simplified side view of still another embodiment of a portion of the disk drive having features of the present invention.

FIG. 8 is a side view of another embodiment of a portion of a disk drive 810. In this embodiment, the disk drive 810 includes a drive housing 812, a storage disk 816, a head stack assembly 820 and a pressure compensator 825. In this embodiment, the head stack assembly includes an actuator hub 830 that rotates to move the suspension 832 and the slider assembly 824 relative to the storage disk 816. The pressure compensator 825 is coupled to the head stack assembly 820 and can expand and contract to raise and/or lower the actuator hub 830, and thus, the suspension 832 and the slider assembly 824 to effectively change the distance between a portion of the slider assembly 824 and the storage disk 816.

While the particular pressure compensator 25 and disk drive 10, as herein shown and disclosed in detail, are fully capable of obtaining the objects and providing the advantages herein before stated, it is to be understood that they are merely illustrative of various embodiments of the invention. No limitations are intended to the details of construction or design herein shown other than as described in the appended claims.

What is claimed is:

1. A disk drive comprising:
a storage disk;
a head suspension assembly including a slider assembly having a read/write head that magnetically interacts with the storage disk; and
a pressure compensator that is coupled to one of the storage disk and the head suspension assembly, the pressure compensator having a sealed fluid container with a volume that changes when ambient pressure near the pressure compensator changes, the pressure compensator at least partially offsetting a change in a head-to-disk spacing that occurs upon a change in the ambient pressure.

2. The disk drive of claim 1 further comprising a drive circuitry, wherein the pressure compensator is electrically decoupled from the drive circuitry.

3. The disk drive of claim 1 wherein the head suspension assembly includes a suspension that supports the slider assembly, and wherein the pressure compensator exerts a force on the suspension that changes when the ambient pressure near the pressure compensator changes.

4. The disk drive of claim 3 wherein the force exerted by the pressure compensator changes a pivot angle between the suspension and the slider assembly.

5. The disk drive of claim 3 wherein the force exerted by the pressure compensator changes a pitch angle between the slider assembly and the storage disk.

6. The disk drive of claim 3 wherein the pressure compensator is secured to the slider assembly.

7. The disk drive of claim 1 wherein the head suspension assembly includes a suspension that supports the slider assembly, and wherein the pressure compensator exerts a force on the slider assembly that changes when the ambient pressure near the pressure compensator changes.

8. The disk drive of claim 7 wherein the force exerted by the pressure compensator changes a pivot angle between the suspension and the slider assembly.

9. The disk drive of claim 7 wherein the force exerted by the pressure compensator changes a pitch angle between the slider assembly and the storage disk.

10. The disk drive of claim 7 wherein the pressure compensator is secured to the suspension.

11. The disk drive of claim 1 wherein the pressure compensator causes the slider assembly to pivot relative to the head suspension assembly.

12. The disk drive of claim 1 wherein the pressure compensator is coupled to the storage disk, and wherein the pressure compensator moves the storage disk relative to the slider assembly.

13. The disk drive of claim 1 further comprising an actuator hub that moves the head suspension assembly relative to the storage disk, and wherein the pressure compensator exerts a force that moves the actuator hub relative to the storage disk.

14. The disk drive of claim 1 wherein the pressure compensator has a shape that changes when the ambient pressure near the pressure compensator changes.

15. The disk drive of claim 1 wherein the pressure compensator includes a gas within the container, the container facilitating volume changes of the gas so that the volume of the gas is approximately inversely proportional to the pressure of the gas.

16. The disk drive of claim 15 wherein the container conforms to the volume of the gas when the pressure inside the container changes.

17. The disk drive of claim 15 wherein the container is at least partially formed from a bimetallic material.

18. The disk drive of claim 17 wherein the container expands substantially in a first direction when a decrease in ambient pressure occurs, and the container expands substantially in a second direction that is different than the first direction when an increase in temperature near the pressure compensator occurs.

19. The disk drive of claim 1 wherein the pressure compensator substantially cancels a change in a head-to-disk spacing that occurs upon a change in the ambient pressure near the slider assembly.

20. The disk drive of claim 1 wherein the pressure compensator includes a piston that moves based on changes in ambient pressure near the pressure compensator.

21. The disk drive of claim 1 wherein the pressure compensator includes a resilient membranous material that changes shape based on changes in ambient pressure near the pressure compensator.

22. A disk drive comprising:
a storage disk;
a suspension;
a slider assembly including a read/write head; and
a pressure compensator that couples the slider assembly to the suspension, the pressure compensator having a sealed fluid container with a volume that changes with changes in ambient pressure near the pressure compensator to change a pitch angle between the slider assembly and the storage disk.

23. The disk drive of claim 22 further comprising a drive circuitry, wherein the pressure compensator is electrically decoupled from the drive circuitry.

24. The disk drive of claim 22 wherein the pressure compensator exerts a force on the suspension that changes when the ambient pressure near the pressure compensator changes.

25. The disk drive of claim 24 wherein the force exerted by the pressure compensator changes a pivot angle between the suspension and the slider assembly.

26. The disk drive of claim 22 wherein the pressure compensator is directly secured to the slider assembly.

27. The disk drive of claim 22 wherein the pressure compensator exerts a force on the slider assembly that changes when the ambient pressure near the pressure compensator changes.

28. The disk drive of claim 22 wherein the pressure compensator is secured to the suspension.

29. The disk drive of claim 22 wherein the pressure compensator has a shape that changes when the ambient pressure near the pressure compensator changes.

30. The disk drive of claim 22 wherein the fluid container volume is a gas, the container facilitating volume changes of the gas so that the volume of the gas is approximately inversely proportional to the pressure of the gas.

31. The disk drive of claim 30 wherein the container conforms to the volume of the gas when the pressure inside the container changes.

32. The disk drive of claim 30 wherein the container is at least partially formed from a bimetallic material.

33. The disk drive of claim 32 wherein the container expands substantially in a first direction when a decrease in ambient pressure occurs, and the container expands substantially in a second direction that is different than the first direction when an increase in temperature near the pressure compensator occurs.

34. The disk drive of claim 22 wherein the pressure compensator substantially cancels a change in a head-to-disk spacing that occurs upon a change in the ambient pressure near the slider assembly.

35. The disk drive of claim 22 wherein the pressure compensator includes a piston that moves based on changes in ambient pressure near the pressure compensator.

36. The disk drive of claim 22 wherein the pressure compensator includes a resilient membranous material that changes shape based on changes in ambient pressure near the pressure compensator.

37. A disk drive comprising:
a storage disk;
a suspension;
a slider assembly including a read/write head; and
a pressure compensator that couples the slider assembly to the suspension, the pressure compensator having a sealed fluid container with a volume that changes with changes in ambient pressure near the pressure compensator to change a pivot angle between the slider assembly and the suspension.

38. The disk drive of claim 37 further comprising a drive circuitry, wherein the pressure compensator is electrically decoupled from the drive circuitry.

39. The disk drive of claim 37 wherein the pressure compensator exerts a force on the suspension that changes when the ambient pressure near the pressure compensator changes.

40. The disk drive of claim 39 wherein the force exerted by the pressure compensator changes a pitch angle between the slider assembly and the storage disk.

41. The disk drive of claim 37 wherein the pressure compensator is directly secured to the slider assembly.

42. The disk drive of claim 37 wherein the pressure compensator exerts a force on the slider assembly that changes when the ambient pressure near the pressure compensator changes.

43. The disk drive of claim 42 wherein the pressure compensator is secured to the suspension.

44. The disk drive of claim 37 wherein the pressure compensator has a shape that changes when the ambient pressure near the pressure compensator changes.

45. The disk drive of claim 37 wherein the sealed fluid container encloses is a gas within the container, the container facilitating volume changes of the gas so that the volume of the gas is approximately inversely proportional to the pressure of the gas.

46. The disk drive of claim 45 wherein the container conforms to the volume of the gas when the pressure inside the container changes.

47. The disk drive of claim 45 wherein the container is at least partially formed from a bimetallic material.

48. The disk drive of claim 47 wherein the container expands substantially in a first direction when a decrease in ambient pressure occurs, and the container expands substantially in a second direction that is different than the first direction when an increase in temperature near the pressure compensator occurs.

49. The disk drive of claim 37 wherein the pressure compensator substantially cancels a change in a head-to-disk spacing that occurs upon a change in the ambient pressure near the slider assembly.

50. The disk drive of claim 37 wherein the pressure compensator includes a piston that moves based on changes in ambient pressure near the pressure compensator.

51. The disk drive of claim 50 wherein the pressure compensator includes a resilient membranous material that changes shape based on changes in ambient pressure near the pressure compensator.

52. A method of adjusting head-to-disk spacing in a disk drive, the method comprising the steps of:
providing a storage disk, a head suspension assembly including a slider assembly having a read/write head that magnetically interacts with the storage disk, and a pressure compensator that is coupled to one of the storage disk and the head suspension assembly and has a sealed fluid container with a volume that changes with changes in ambient pressure near the pressure compensator; and
exerting a force against the slider assembly and the head suspension assembly to change a pivot angle between the slider assembly and the suspension using the pressure compensator.

53. The method of claim 52 further comprising the step of electrically decoupling the pressure compensator from a drive circuitry of the disk drive.

54. The method of claim 52 wherein the step of exerting includes using the pressure compensator to at least partially offset a change in a head-to-disk spacing that occurs between the read/write head of the slider assembly and the storage disk when the ambient pressure near the slider assembly changes.

55. A method of adjusting the head-to-disk spacing in a disk drive, the method comprising the steps of:
providing a storage disk, a suspension, a slider assembly including a read/write head and a pressure compensator that couples the slider assembly to the suspension, the pressure compensator having a sealed fluid container with a volume that changes with changes in ambient pressure near the pressure compensator; and
exerting a force against the slider assembly and the suspension to change a pitch angle between the slider assembly and the storage disk using the pressure compensator.

56. The method of claim 55 further comprising the step of electrically decoupling the pressure compensator from a drive circuitry of the disk drive.

57. The method of claim 55 wherein the step of exerting includes using the pressure compensator to at least partially offset a change in a head-to-disk spacing that occurs between the read/write head of the slider assembly and the storage disk when the ambient pressure near the slider assembly changes.

* * * * *

UNITED STATES PATENT AND TRADEMARK OFFICE
CERTIFICATE OF CORRECTION

PATENT NO. : 7,639,449 B1  
APPLICATION NO. : 11/059032  
DATED : December 29, 2009  
INVENTOR(S) : Kose et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 929 days.

Signed and Sealed this

Ninth Day of November, 2010

David J. Kappos  
*Director of the United States Patent and Trademark Office*